UNITED STATES PATENT OFFICE 2,416,248

METAL COMPLEXES OF AZO DYES AND PROCESS OF PRODUCTION

Harold E. Woodward, Penns Grove, N. J., assignor to E. I. du Pont de Nemours & Company, Wilmington, Del., a corporation of Delaware No Drawing. Application July 13, 1943, Serial No. 494,509

6 Claims. (Cl. 260—151)

This invention relates to metallic complexes of azo dyes, being pigments.

Metal compounds of azo dyestuffs, one component of which is anthranilic acid, are known, as shown in Colour Index 216, U. S. Patent 1,783,083, and Journal of the Chemical Society, 1938, page 292. None of the compounds so formed have the characteristics of those which I have invented.

It is an object of this invention to produce violet to brown pigments having excellent pigment characteristics.

The object of the invention is accomplished by making monazo colors of the type represented by the formula:

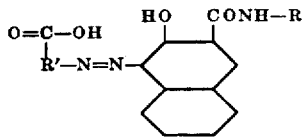

and metallizing them. In this formula R and R' are aromatic radicals of the benzene or naphthalene series, and the azo and carboxy groups are in ortho position to each other. The azo component and R may bear substituents which do not confer water-solubility, such as alkyl, alkoxy, halogen, and nitro. Among the halogens bromine and chlorine are preferred and among the alkyls, and alkoxys, methyl and methoxy are preferred.

The diazo components of my invention are ortho-amino-benzoic acids which may be substituted by chlorine, bromine, nitro, benzo, alkyl, and alkoxy groups. Exemplary thereof are 2-amino-4-bromo-benzoic acid, 2-amino-4-methyl-benzoic acid, 2-amino-5-methyl-benzoic acid, 2-amino-4-methoxy-benzoic acid, 2-amino-4-nitro-benzoic acid and 1-amino-2-naphthoic acid. Additional examples are given hereinafter.

The coupling components used in my process are arylamides of 2-hydroxy-3-naphthoic acid, in which the amine is from the benzene or naphthalene series. Illustrations of this class are: 2'-hydroxy-3'-naphthoyl derivatives of o- and p-toluidine, o-anisidine, p-brom-aniline, 2-methyl-4-chlor-aniline, 2-chlor-4-methyl-aniline, m-nitro-aniline, alpha-naphthylamine and 1-amino-5-methoxy-naphthalene.

In the process of making these pigments it is not necessary to adhere strictly to the conditions given for the diazotization and coupling reaction, but reasonable variations in the concentration, temperature, hydrogen ion concentration and solvent, are allowable as explained in Groggins, Unit Processes in Organic Synthesis, page 145. In the metallization reaction it is desirable to have an acid buffer present in order to assist the reaction of the hydroxyl group. As shown in the examples this buffer may be a basic compound like ammonia or an alkyl amine or a salt of a weak acid. The buffer does not react with the pigment but only with the acid formed in the reaction, and its function is to keep the pH above 5.0. As is usual in the preparation of pigments, the physical form of the pigment may be modified by making it in solutions of different pH. Such different conditions usually affect the masstone of the pigment and sometimes affect the tint and also the light fastness.

Cobalt, nickel and copper are elements of atomic numbers 27–29. In general, copper gives the brightest colors and cobalt the dullest. The pigments obtained from the different coupling components are not all equally bright or equally fast to light, but they vary from brown to violet and from fair to excellent fastness to light.

The following examples are given for purposes of illustration of the results and principles of the invention but do not constitute a limitation.

Example I

A solution of the diazonium carboxylate prepared by treating 137 parts of anthranilic acid with 1.5 equivalents of hydrochloric acid and 1 equivalent of sodium nitride was gradually dropped at 10° C. into a solution of 275 parts of 2'-hydroxy-3'-naphthoyl aniline (Naphthanil AS) and 64 parts of sodium hydroxide in 600 parts of alcohol and 800 parts of water. The red pigment was filtered and washed with 5% brine, then slurried in 10,000 parts of water. To this slurry was added 525 parts of copper sulfate crystals and 300 parts of sodium acetate crystals and it was heated to 90–95° for three hours. After this time the pigment was filtered, washed and dried.

This pigment, when ground in lithographic varnish, gave a maroon ink of very good fastness to light in both the masstone and the undertone (printing tone). When extended with a zinc oxide ink, it gave a red violet tint of fair fastness to light.

This pigment was incorporated in a water-in-lacquer emulsion in which the lacquer phase contained a pigment binding agent. Cotton was printed with this pigmented vehicle. After the violet print was dried at 150° C. for 5 minutes, it showed good fastness to chlorine, power laundering, trubenizing and light, being equal in these tests to violet prints obtained from more expensive types of pigments.

When 800 parts of ammonium hydroxide solution or 200 parts of diethanolamine was used in place of 300 parts of sodium acetate in the metallization reaction described above, the same pigment was obtained.

This pigment may be represented by the formula

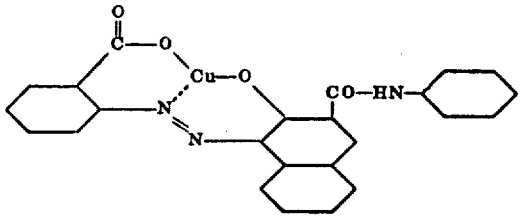

Example XVII

A portion of the pigment of Example 9 was dispersed in water by grinding in a solution of 1,1'-dinaphthyl - methane - 2,2'-disulfonic acid, and this dispersion was used for dyeing a piece of nylon cloth. The piece was dyed a red color of good fastness to light. In a similar manner the pigment of Example 10 gave on nylon a red violet dyeing of good fastness to light.

Likewise other pigments of this type were made and dyed on nylon as shown in the following table.

| Ex. | Diazo component | 2'-hydroxy-3'-naphthoyl | Metal salt | Color |
|---|---|---|---|---|
| 2 | Anthranilic acid | p-Chlor-aniline | Copper acetate | Dull violet. |
| 3 | do | do | Nickel acetate | Dark brown. |
| 4 | do | o-Toluidine | Nickel ammonium chloride | Red brown. |
| 5 | do | Beta-naphthylamine | Copper ammonium chloride | Maroon. |
| 6 | 2-amino-4-chlorobenzoic acid | Aniline | do | Bordeaux. |
| 7 | 2-amino-6-chlorobenzoic acid | do | Cobalt ammonium chloride | Gray. |
| 8 | do | do | Nickel ammonium chloride | Brown. |
| 9 | 2-amino-5-chlorobenzoic acid | do | do | Brown violet. |
| 10 | do | do | Copper acetate | Red-violet. |
| 11 | do | p-Chlor-aniline | Cobalt ammonium chloride | Gray. |
| 12 | do | do | Nickel ammonium chloride | Maroon. |
| 13 | do | do | Copper acetate | Do. |
| 14 | 2-amino-5-nitrobenzoic acid | Aniline | Copper ammonium sulfate | Do. |
| 15 | 2-amino-3-naphthoic acid | do | Copper acetate | Dull violet. |
| 16 | do | do | Nickel ammonium chloride | Maroon. |

| Ex. | Diazo component | 2'-hydroxy-3'-naphthoyl | Metal salt | Color |
|---|---|---|---|---|
| 18 | 2-amino-5-chlorbenzoic acid | Aniline | Cobalt ammonium chloride | Drab. |
| 19 | Anthranilic acid | p-Anisidine | Nickel acetate | Orange-red. |
| 20 | do | do | Copper acetate | Bluish-red. |

Example XXI

A water dispersion of the pigment of Example 10, made as in Example 17, was used for beater dyeing of paper. The paper was a red-violet color of good fastness to acid, alkali, ink eradicator and light. Likewise, paper was dyed with the pigment of Example 8, and a red-brown paper of good fastness properties was obtained. When the pigment of Example 15 was used in a similar manner, a violet paper was obtained which did not become duller in artificial light.

As many apparently widely different embodiments of this invention may be made without departing from the spirit and scope thereof, it is to be understood that I do not limit myself to the specific embodiments thereof except as defined in the appended claims.

I claim:

1. A pigment represented by the formula

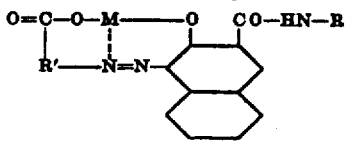

in which R is a radical of the group consisting of phenyl, naphthyl, the nuclearly mono-substituted chloro, bromo, nitro, methyl and methoxy derivatives of phenyl and the derivatives of phenyl nuclearly di-substituted by chloro and methyl; and R' is the nuclear radical of one of the group consisting of 1-amino-2- and -2-amino-3-naphthoic acid, 2-amino-benzoic acid, and the nuclearly mono-substituted chloro, bromo, nitro, methyl and methoxy derivatives of 2-amino-benzoic acid; and M is an element of the group consisting of copper, nickel and cobalt; the group O=C— on the R' component being in the ortho position to the azo linkage.

2. A pigment represented by the formula

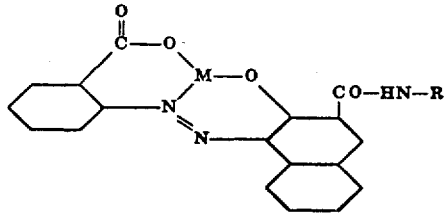

in which R is a radical of the group consisting of phenyl, naphthyl, the nuclearly mono-substituted chloro, bromo, nitro, methyl and methoxy derivatives of phenyl and the derivatives of phenyl nuclearly di-substituted by chloro and methyl; and M is an element of the group consisting of copper, nickel and cobalt.

3. The pigment represented by the formula

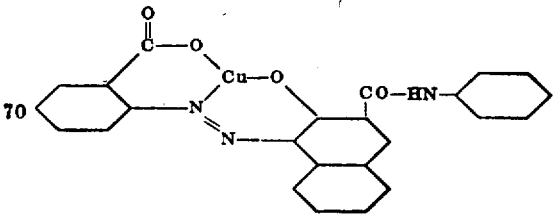

4. The copper complex of the monazo compound which results from coupling diazotized 2-amino-4-chloro-benzoic acid with the anilide of 2-hydroxy-3-naphthoic acid, and reacting the resulting monazo compound in a solution of a water-soluble salt of copper, until a metal complex of said monazo compound is produced.

5. The copper complex of the monazo compound which results from coupling diazotized 2-amino-3-naphthoic acid with the anilide of 2-hydroxy-3-naphthoic acid, and reacting the resulting monazo compound in a solution of a water-soluble salt of copper, until a metal complex of said monazo compound is produced.

6. The process of making a metallized complex which comprises forming a monazo compound by coupling a diazotized ortho-carboxy-primary-arylamine which is devoid of any other water-solubilizing group, and a 2'-hydroxy-3'-naphthoyl arylamide which is devoid of water-solubilizing groups; and reacting the resulting monazo compound in a solution of a water-soluble salt of an element of the group consisting of copper, nickel and cobalt, until a metal complex of said monazo compound is produced, the aryl radical of said diazotized arylamine being the nuclear radical of one of the group consisting of 1-amino-2- and 2-amino-3-naphthoic acid, 2-amino-benzoic acid and the nuclearly mono-substituted chloro, bromo, nitro, methyl and methoxy derivatives of 2-amino-benzoic acid; and said aryl amide group being represented by the formula —COHN—R wherein R is a radical of the group consisting of phenyl, naphthyl, the nuclearly mono-substituted chloro, bromo, nitro, methyl and methoxy derivatives of phenyl and the derivatives of phenyl nuclearly di-substituted by chloro and methyl.

HAROLD E. WOODWARD.

REFERENCES CITED

The following references are of record in the file of this patent:

UNITED STATES PATENTS

| Number | Name | Date |
|---|---|---|
| 1,914,427 | Heyna | June 30, 1933 |
| 2,019,914 | Kracker | Nov. 5, 1935 |
| 1,785,846 | Thiess | Dec. 23, 1930 |

FOREIGN PATENTS

| Number | Country | Date |
|---|---|---|
| 48,925 | French | June 21, 1938 |
| 510,479 | German | Oct. 23, 1930 |
| 794,817 | French | Dec. 26, 1935 |

Certificate of Correction

Patent No. 2,416,248. February 18, 1947.

HAROLD E. WOODWARD

It is hereby certified that error appears in the printed specification of the above numbered patent requiring correction as follows: Column 2, line 31, Example 1, for "nitride" read *nitrite*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.* pound which results from coupling diazotized 2-amino-4-chloro-benzoic acid with the anilide of 2-hydroxy-3-naphthoic acid, and reacting the resulting monazo compound in a solution of a water-soluble salt of copper, until a metal complex of said monazo compound is produced.

5. The copper complex of the monazo compound which results from coupling diazotized 2-amino-3-naphthoic acid with the anilide of 2-hydroxy-3-naphthoic acid, and reacting the resulting monazo compound in a solution of a water-soluble salt of copper, until a metal complex of said monazo compound is produced.

6. The process of making a metallized complex which comprises forming a monazo compound by coupling a diazotized ortho-carboxy-primary-arylamine which is devoid of any other water-solubilizing group, and a 2'-hydroxy-3'-naphthoyl arylamide which is devoid of water-solubilizing groups; and reacting the resulting monazo compound in a solution of a water-soluble salt of an element of the group consisting of copper, nickel and cobalt, until a metal complex of said monazo compound is produced, the aryl radical of said diazotized arylamine being the nuclear radical of one of the group consisting of 1-amino-2- and 2-amino-3-naphthoic acid, 2-amino-benzoic acid and the nuclearly mono-substituted chloro, bromo, nitro, methyl and methoxy derivatives of 2-amino-benzoic acid; and said aryl amide group being represented by the formula —COHN—R wherein R is a radical of the group consisting of phenyl, naphthyl, the nuclearly mono-substituted chloro, bromo, nitro, methyl and methoxy derivatives of phenyl and the derivatives of phenyl nuclearly di-substituted by chloro and methyl.

HAROLD E. WOODWARD.

REFERENCES CITED

The following references are of record in the file of this patent:

UNITED STATES PATENTS

| Number | Name | Date |
|---|---|---|
| 1,914,427 | Heyna | June 30, 1933 |
| 2,019,914 | Kracker | Nov. 5, 1935 |
| 1,785,846 | Thiess | Dec. 23, 1930 |

FOREIGN PATENTS

| Number | Country | Date |
|---|---|---|
| 48,925 | French | June 21, 1938 |
| 510,479 | German | Oct. 23, 1930 |
| 794,817 | French | Dec. 26, 1935 |

Certificate of Correction

Patent No. 2,416,248.   February 18, 1947.

HAROLD E. WOODWARD

It is hereby certified that error appears in the printed specification of the above numbered patent requiring correction as follows: Column 2, line 31, Example 1, for "nitride" read *nitrite*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.*